June 9, 1964 A. C. GRASMOEN 3,135,978
PNEUMATIC CUSHION COASTER SLIDE
Filed July 16, 1962
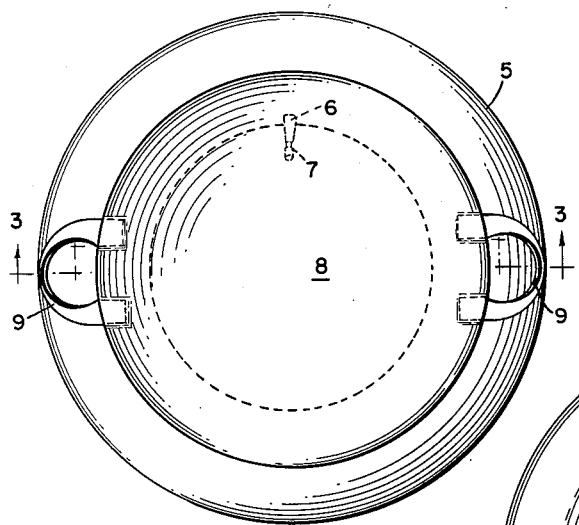
FIG. 1.
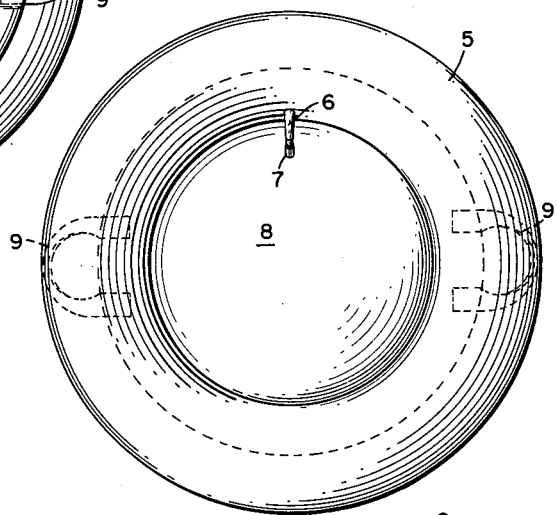
FIG. 2.
FIG. 3.
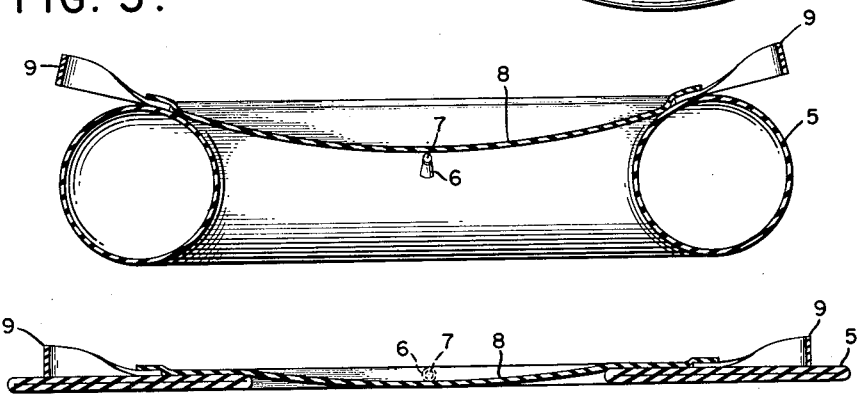
FIG. 4.
INVENTOR
Albert C. Grasmoen
BY *Garvey & Garvey*
ATTORNEYS 3,135,978
PNEUMATIC CUSHION COASTER SLIDE
Albert C. Grasmoen, P.O. Box 58, Flagstaff, Ariz.
Filed July 16, 1962, Ser. No. 210,132
3 Claims. (Cl. 9—347)

The present invention is a pneumatic cushion coaster slide, primarily adapted for use on snow covered hills, ski slopes and the like, by both childrren and adults. The cushion slide of this invention has various other uses, such as on water slides at amusement parks and the like, as a float or life preserver for use in water sports, as well as auxiliaries for boats of various miscellany.

Objects of this invention are to provide a pneumatic cushion, inflatable and deflatable at the option of the user, the cushion having a central opening in which a flexible seat is pendently carried, the seat being carried by the top of the cushion; to provide a relatively inexpensive cushion, such as an inner tube of a motor vehicle tire, made of rubber, or suitable synthetic material, which is waterproof and quickly inflatable or deflatable, and when deflated may be folded into a relatively flat package for convenience in transportation; to provide a cushion, in which the seat may be vulcanized to the top of the cushion, the vertical extent of the cushion, when inflated, being sufficient to hold the portion of the body of the passenger, occupying the seat, elevated above the surface upon which the cushion is supported; and to provide a cushion equipped with handholds, at diametrically opposite points on the cushion, for use by the passenger, while occupying the seat, and to facilitate carrying of the deflated cushion. Each of the handholds comprises a strap, the ends of which are moved into parallel relation and vulcanized to the top of the cushion, beneath the seat perimeter.

Prior Art

| | | |
|---|---|---|
| 4,356 | Day | Jan. 15, 1846 |
| 671,502 | Sultemeyer | Apr. 9, 1901 |
| 2,154,040 | Frisendahl | Apr. 11, 1939 |
| 2,396,212 | Spanel | Mar. 5, 1946 |
| 2,804,633 | Taylor et al. | Sept. 3, 1957 |
| 2,876,467 | Lund | Mar. 10, 1959 |

Other objects of this invention will be manifest from the following description of the present preferred form of the invention, taken in connection with the accompanying drawing, wherein:

FIG. 1 is a top plan view of a pneumatic cushion coaster slide constructed in accordance with the present invention, with the cushion inflated;

FIG. 2 is a bottom plan view of the same;

FIG. 3 is a cross-sectional view taken on the line 3—3 of FIG. 1, illustraitng to advantage the manner in which the handholds are vulcanized between the seat and cushion; and FIG. 4 is a cross-sectional view of the invention in collapsed position.

This invention includes a cushion body 5 which, in the present instance, is shown to consist of a pneumatic tube such as used as inner tubes of motor vehicle tires. The tube has extending, from its inner wall, an inflating and deflating stem 6 which carries a cap 7. It has been found that by use of the present invention the stem may be equipped with a conventional valve, or the valve may be omitted and a rubber cap used, which is screwed to the threads of the stem 6. By following the latter procedure it has been found that the tube will remain inflated for a considerable period of time. The invention further contemplates the use of a seat portion 8, which preferably comprises a substantially circular sheet of rubber, the perimeter of which is vulcanized to the top of the tube 5, outwardly an appreciable distance from the opening which the tube circumscribes. The seat 8 is of a size to permit the central portion thereof to sag into the tube opening, to provide a bucket-like seat, as advantageously illustrated in FIG. 3.

A pair of handholds 9 are engaged, in a manner shortly to be described, at diametrically opposed points on opposite sides of the cushion, in convenient accessibility to a passenger in seat 8. Each of the handholds consists of a strap, the free ends of which are arranged in parallel relation, and vulcanized between the perimeter of sheet 8 and the top of the tube 5. Vulcanization of the seat and handles to the cushion may be performed in a single operation.

In using the invention as a cushion coaster slide, after the tube 5 has been inflated, the passenger sits in the seat 8 and grasps the handholds 9. The feet of the passenger are held above the coasting surface, and the descent on the snow-covered hill, ski slope or the like begins. Of course, the feet of the passenger being free, they may be used as a brake, at any time desired, during the descent. The same modus operandi is followed on water slides. When used as a float on water, the feet of the passenger may be permitted to pend in the water. Where used as a life preserver, the passenger can be positioned on the seat so as to be in a semi-recumbent position, and towed by a swimmer or a boat.

Where the invention is used as a boat auxiliary, it may be inflated by an air pump, or with commercially available gas.

When the cushion is not in use it may be quickly deflated to lie relatively flat as shown in FIG. 4. It, of course, can be rolled or folded into a relatively small bundle or package. If desired, the flat deflated cushion may be folded in two, to bring the handholds 9 into parallel relation, for convenience in carrying the collapsed cushion.

While there is herein shown a preferred form of the invention, nevertheless it will be obvious that various changes may be made within the scope of the claims hereto appended.

What is claimed is:

1. A pneumatic cushion coaster slide including a conventional pneumatic automobile tire tube, a pair of straps, each adapted to be looped and the ends secured flat to the top of the tube, one strap on each side of the tube, a sheet, the perimeter of which is superimposed on the top of the tube and the ends of said straps and vulcanized to tube and strap ends, for fixedly securing the sheet, tube and strap ends, leaving the loops of the straps free to serve as handles, the intermediate part of the sheet sagging into the opening, circumscribed by the tube, to provide a bucket like passenger seat, the bottom of which seat is held well above the coasting surface to hold the portion of the body of the passenger in the seat, elevated above said surface, during the passenger's itinerary, while coasting.

2. The pneumatic cushion coaster slide of claim 1 wherein the handles are so positioned on the tube, to bring them into close proximity, when the tube is deflated and folded together to permit the handholds to be grasped by one hand, to facilitate carrying the deflated tube.

3. The pneumatic cushion coaster slide of claim 1 with the addition of a conventional inflating and deflating valve stem, projecting inwardly from the inner periphery of the tube, when inflated, at a point beneath the passenger seat, to prevent contact of the valve stem, with any part of the passenger while coasting.

References Cited in the file of this patent

UNITED STATES PATENTS

| | | |
|---|---|---|
| 2,405,484 | Bailhe | Aug. 6, 1946 |
| 2,542,477 | Cart | Feb. 20, 1951 |
| 2,562,080 | Barnes | July 24, 1951 |
| 2,826,423 | Erickson | Mar. 11, 1958 |
| 3,021,536 | Haggerty | Feb. 20, 1962 |